United States Patent Office 2,939,479
Patented June 7, 1960

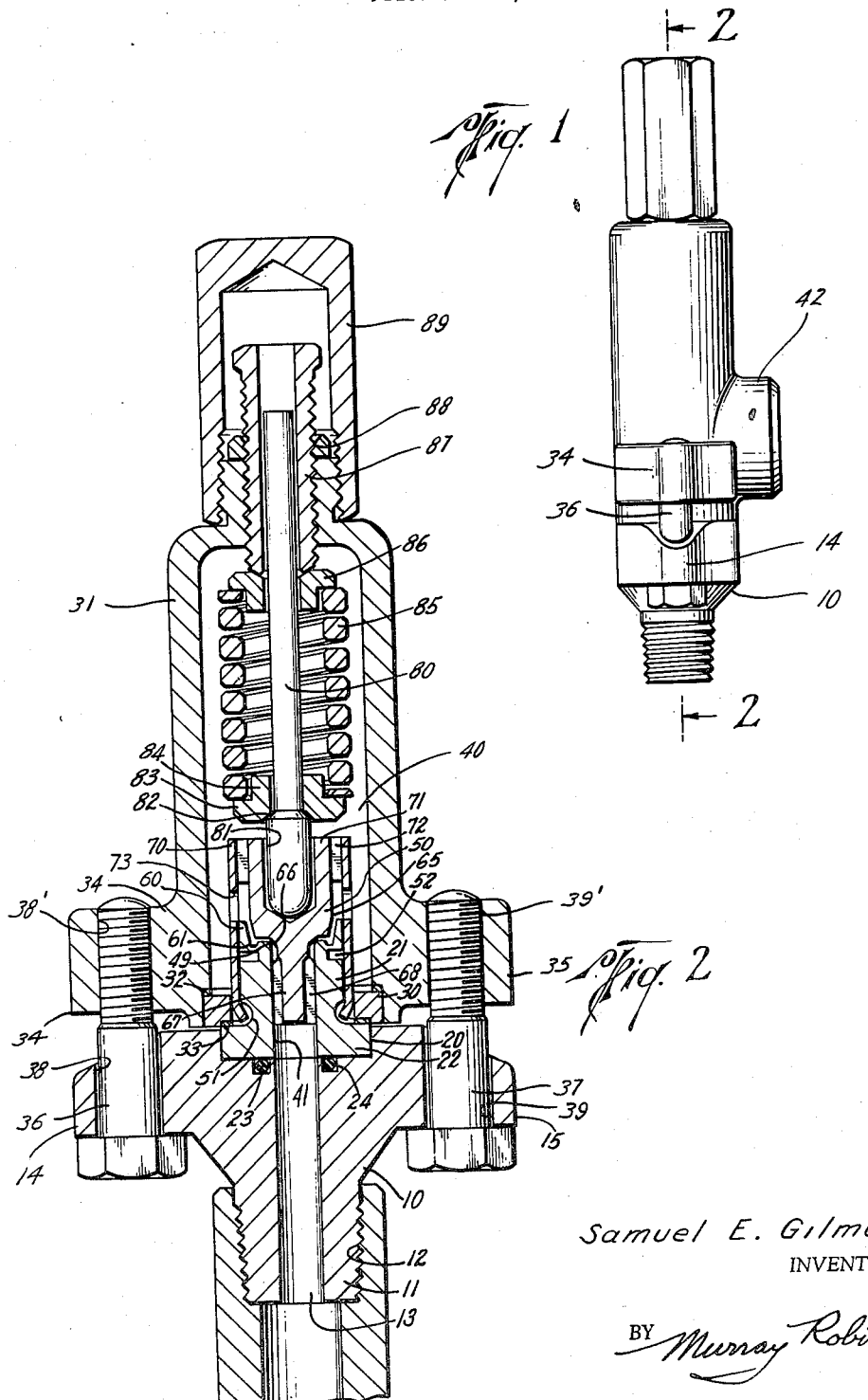

2,939,479
VALVE

Samuel E. Gilmore, Houston, Tex., assignor to Fluid Mechanics Company, Bellaire, Tex., a corporation of Texas Filed Feb. 6, 1957, Ser. No. 638,483

4 Claims. (Cl. 137—469)

This invention pertains to valves and more particularly to spring loaded safety valves useful for gas or liquid and having replaceable valve seats and replaceable valve closure elements.

The principal object of the invention is to provide a spring loaded valve in which the seat and closure element can be replaced without materially altering the loading of the spring.

A further object of the invention is to provide a replaceable seat valve in which the seat will seal with the valve closure in all cases.

Another object of the invention is to provide a valve that can be easily installed even in areas of restricted clearance.

A further object of the invention is to provide a relief valve that can withstand high back pressure.

Still further objects of the invention are to provide a valve that is inexpensive to manufacture and maintain and at the same time rugged and reliable in operation.

Other objects and advantages of the invention will appear from the following description of a preferred embodiment thereof, reference being made to the accompanying drawings wherein:

Figure 1 is a side elevation of a safety relief valve embodying the invention; and Figure 2 is a section on line 2—2 of Figure 1.

The valve comprises a base 10 having a pin 11 forming the valve inlet. The pin is exteriorly threaded at 12. An axial passage 13 extends upwardly through the inlet and continues on through the upper portion of the base 10. The upper portion of the base has flanges 14, 15 extending radially outwardly on opposite sides of the valve.

The upper end of the base 10 is counterbored at 20 to receive a stainless steel nozzle 21 whose lower end is provided with a radial flange 22 which fits snugly in counterbore 20 and extends slightly above the upper end of the base. An O-ring 23 is disposed in an annular groove 24 around the upper end of passage 13 to seal between the nozzle and base.

The nozzle is held in place by a compression ring 30 and a bonnet 31, there being metal gaskets 32, 33 between ring and bonnet and between seal ring and nozzle whereby the bonnet is sealed fluid tight to the nozzle. The bonnet has two radial flanges 34, 35 overlying flanges 14, 15 of the base, and the bonnet is held to the base by screws 36, 37 passing through holes 38, 39 in flanges 14, 15 and screwed into threaded holes 38, 39 in flanges 34, 35. There is clearance between the upper end of base 10 and the lower ends of both the compression ring 30 and bonnet 31 so that tightening of the screw 36, 37, places ring 30 and gaskets 32, 33 in compression to effect a seal.

The bonnet 31 is a generally cylindrical tube having an interior space 40 which is in communication with passage 13 in the base through axial passage 41 of the nozzle when the valve is open. At one side of bonnet 31 is a short pipe 42 (Figure 1) in communication with space 40 and forming the valve outlet. Pipe 42 is interiorly threaded for connection to an exhaust line.

The upper end of nozzle 21 has a short 45 degree bevel 49 around the inner edge of its lip. This bevel is only about .015 inch long measured on a cone element. This serves the dual function of giving the nozzle an approximate Venturi shape for more efficient and stable discharge and providing a tapered seat for the valve closure element or "disc" 50. The nozzle is provided with two stress relieving grooves 51, 52. These grooves relieve any unbalanced stress in the nozzle that may be occasioned by clamping it to the base so that the seat 49 will be concentric with the valve axis, being displaced neither laterally or angularly therefrom. Distortion of the nozzle and misalignment of the seat is initially reduced because the nozzle is clamped to the base so that there is no torsional stress in the nozzle.

Rising above the valve seat at the outer periphery of the nozzle is a collar 60 which is slightly tapered on its inner wall. Between collar 60 and seat 49 there is a trash groove 61 into which debris can collect which may fall back into the nozzle as the valve closes, without preventing closure of the valve.

The valve closure element is made of stainless steel and comprises a disc shaped portion 65 leaving a 45 degree tapered central portion 66 on its underside adapted to engage and seal with seat 49. From the lower central part of the disc extends downwardly a lower guide stem 67 having a plurality of flutes 68 therearound engaging closely the inner surface of the wall of passage 41 in the nozzle.

The lower surface of disc 65 outside tapered central portion 66 is flat and when the valve is closed there is a slight clearance between the flat portion of the valve disc and the flat portion of the nozzle between seat 45 and trash groove 61. The outer periphery of disc 65 is tapered to provide a slight clearance inside collar 60 when the valve is closed. When the valve opens the space between the valve disc and the valve seat is confined by the collar forming a reaction chamber. When the valve is used to control a gaseous fluid, the reaction chamber causes a force to be exerted tending to hold the valve open until after the static pressure has dropped below that at which the valve opened. The reaction chamber may be omitted where the valve is used for liquid control.

A guide sleeve 70 is disposed closely around the nozzle, being crimped at its lower end into groove 51. Sleeve 70 rises above collar 60. The valve closure element has cylindrical guide stem 71 rising thereabove having a plurality of flutes 72 engaging closely with the inside of sleeve 70. With both upper and lower guide stems the valve disc is held closely to a predetermined path of travel insuring proper seating on closure of the valve thus making possible the use of the narrow valve seat 49.

Guide sleeve 70 is provided with ports 73 for the passage of fluid discharged from the nozzle when the valve is open so that all of the escaping fluid does not have to pass between flutes 72 on the upper guide stem. Flutes 72 do not extend down the whole length of stem 71, stopping just above the ports 73 when the valve is closed so that ports 73 are never blocked.

The lower enlarged bulb end of a thrust rod or spring post 80 rests in a socket 81 in the top of the upper guide stem 71. An upwardly facing shoulder 82 is formed at the juncture of the enlarged lower end of the post with the upper portion thereof. A spring plate or thrust washer 83 rests on shoulder 82. Centered on spring plate 83 by a tubular extension 84 on the upper face of the spring plate is a helical compression spring 85. The spring is similarly centered on an upper spring plate 86 around post 80 disposed just below the top of bonnet 31. A tubular screw 87 threaded into the top of the bonnet bears at its lower end on top of spring plate 86. Spring post 80 extends slidably up inside screw 87 and serves to center the whole assembly within the bonnet. A lock nut 88 on the outside of screw 87 serves to hold the screw in the selected position corresponding to the desired adjustment of the spring compression. A hood 89 screwed on to the top of the bonnet 31 covers the upper end of the valve bonnets whereby any fluid entering space 40 from nozzle 31 can leave only through pipe 42 and so that when the valve is closed it can effectively hold back pressure from pipe 42.

When the valve is installed in a line or vessel to be controlled or protected as to pressure build-up, the pin 11 is screwed into a threaded hole in such line or vessel. Since the bonnet is held to the base by a flanged union rather than by a threaded connection, any part of the valve bonnet or base can be seized with a wrench in screwing the valve into the line or vessel. This greatly facilitates installation in cramped spaces. Also, there is no possibility of the setting of the spring compression being changed during installation by any relative movement of the parts.

Whenever it becomes necessary to replace the valve seat and disc, the screws 36 and 37 can be loosened and the bonnet removed and the nozzle and closure element replaced. By holding to close tolerances the distance between the bottom of socket 81 in the upper guide stem and the top of nozzle flange 22, when the valve is reassembled the setting of the spring compression and hence of the pressure at which the valve will open (and close) can be controlled in the present construction so as to be within 10% of the original setting without readjustment of screw 87.

While a preferred embodiment of the invention has been shown and described many modifications thereof can be made by one skilled in the art without departing from the spirit of the invention and it is desired to cover by Letters Patent all forms of the invention falling within the scope of the following claims.

I claim:

1. In a valve including a base having a passage therethrough, one end of said passage providing an inlet to the valve, means on said base at said inlet for connecting the valve to another member having an opening therein, a recess in said base around the other end of said passage providing a socket, a valve seat unit having an annular flange at one end received in said socket, a hollow bonnet having an open passage therethrough, one end of said open passage providing an outlet for the valve, said valve seat unit including a tubular body extending from said valve seat unit flange into said bonnet through the other end of said open passage, means sealing between said other end of said open passage and said valve seat unit flange, a flange on said base at the socket end of the passage therethrough, a flange on said bonnet at said other end of said open passage therethrough, bolt means connecting said flanges and clamping said valve seat unit flange in said socket, said tubular body of said valve seat unit having an internal bevel forming a valve seat adjacent the end of said body remote from said valve seat unit flange, a valve closure element having a portion bevelled correlative to said seat, spring means urging said closure element toward said valve seat, bulb and socket means providing the engagement of said spring means and closure element to permit relative rocking thereof, said spring means being adjustable to vary the force thereof urging said closure element toward said seat, and guide means cooperating between said closure element and the inside of said tubular body to constrain said closure element to reciprocation along the axis of said body, the improvement characterized by the fact that said means sealing between said valve seat unit flange and said bonnet includes metal compression ring means overlapping the outer periphery of said seat unit flange and received in a socket formed at said other end of said open passage through said bonnet, said seat unit is everywhere spaced from said bonnet, said flange of said seat unit being spaced from said bonnet by said compression ring means and there being an annular space between said tubular body of the seat unit and said bonnet, stress relieving groove means around said tubular body adjacent said seat unit flange, a sleeve telescopically disposed around said tubular body and crimped at its end nearest said seat unit flange into said stress relieving groove means, said sleeve being spaced everywhere from said bonnet and said base, said sleeve having a portion extending beyond said tubular body forming a second guide means cooperating slidingly with said valve closure element to further constrain said valve closure element to reciprocating motion along the axis of said tubular body of the valve seat unit.

2. The combination of claim 1 in which said valve closure element has an annular flat surface perpendicular to said valve seat unit body axis disposed around said bevelled portion of said valve closure element, and an annular flaring surface beyond said flat surface, said flaring surface flaring going in the axial direction away from said bevelled surface, said tubular body has an annular flat surface extending around and adjacent said bevel that forms said valve seat and parallel to said flat surface of the closure element, and said tubular body has a collar at the valve seat end thereof extending beyond said seat providing on its inner surface an annular surface close to but spaced from said flaring surface of said closure element to confine the flow of fluid from the space between said flat surfaces of said closure element and said tubular body, said tubular body has stress relief groove means around its outer periphery at the juncture of said collar and valve seat, the exterior of said collar being in engagement with the interior of that portion of said sleeve that extends beyond said tubular body.

3. Replaceable valve and seat element combination for a safety valve, said combination comprising a seat unit including a tubular body portion and an annular radial external flange at one end of said body and an internal bevel forming a seat at the other end of said body, a stress relief groove around said unit at the juncture of said flange and body, a sleeve telescopically disposed over said body and having one end crimped in said groove, the other end of said sleeve extending axially beyond said valve seat, a valve closure element including a body having an external annular bevelled portion adapted to engage said seat, and guide means mounting said valve closure body for reciprocation coaxial with said passage between a position in which said external bevelled portion engages said seat and a position in which said external bevelled portion is separated from said seat, said guide means comprising a fluted stem extending from said valve closure body into engagement with the interior surface of said tubular body portion of the seat unit and an externally fluted cup shaped portion extending into engagement with the interior surface of said sleeve where it extends beyond said tubular body portion of the valve seat unit.

4. The combination of claim 3 in which the tubular body of the valve seat unit has a collar at the valve seat end thereof extending beyond said seat inside said portion of said sleeve that extends beyond said tubular body, the inside of said collar lying close to the outside of said closure element, said tubular body having a stress relief groove around the exterior thereof at the juncture of said collar and tubular body adjacent said valve seat.

References Cited in the file of this patent

UNITED STATES PATENTS

| | | |
|---|---|---|
| 1,032,482 | Jerauld | July 16, 1912 |
| 1,143,027 | Blanchard et al. | June 15, 1915 |
| 1,286,397 | Olsen | Dec. 3, 1918 |
| 1,668,453 | Graesser | May 1, 1928 |
| 2,226,732 | McBride | Dec. 31, 1940 |
| 2,695,032 | Kmiecik | Nov. 23, 1954 |